(12) United States Patent
Sakai

(10) Patent No.: US 10,189,329 B2
(45) Date of Patent: Jan. 29, 2019

(54) DAMPING FORCE ADJUSTING MECHANISM

(71) Applicant: AISIN SEIKI KABUSHIKI KAISHA, Kariya-shi, Aichi-ken (JP)

(72) Inventor: Kosuke Sakai, Obu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 65 days.

(21) Appl. No.: 15/335,671

(22) Filed: Oct. 27, 2016

(65) Prior Publication Data

US 2017/0120716 A1 May 4, 2017

(30) Foreign Application Priority Data

Oct. 30, 2015 (JP) ................................. 2015-215139

(51) Int. Cl.
| | |
|---|---|
| B60G 17/08 | (2006.01) |
| F16F 9/19 | (2006.01) |
| F16F 9/50 | (2006.01) |
| B60G 13/08 | (2006.01) |
| F16F 9/46 | (2006.01) |

(52) U.S. Cl.
CPC .............. *B60G 17/08* (2013.01); *B60G 13/08* (2013.01); *F16F 9/19* (2013.01); *F16F 9/465* (2013.01); *F16F 9/50* (2013.01); *B60G 2206/41* (2013.01); *B60G 2500/10* (2013.01); *B60G 2500/11* (2013.01)

(58) Field of Classification Search
CPC .. F16F 9/465; B60G 2500/10; B60G 2600/26

USPC ............................. 188/266.2, 285, 299, 322.15
See application file for complete search history.

(56) References Cited

U.S. PATENT DOCUMENTS

| | | | | |
|---|---|---|---|---|
| 5,078,240 | A | * | 1/1992 | Ackermann ............ F16F 9/465 188/282.2 |
| 5,699,885 | A | | 12/1997 | Förster |
| 6,119,831 | A | | 9/2000 | Knecht et al. |

(Continued)

FOREIGN PATENT DOCUMENTS

| | | |
|---|---|---|
| JP | 3032934 B2 | 4/2000 |
| JP | 3103062 B2 | 10/2000 |
| JP | 4985984 B2 | 7/2012 |

*Primary Examiner* — Robert A. Siconolfi
*Assistant Examiner* — San M Aung
(74) *Attorney, Agent, or Firm* — Buchanan Ingersoll & Rooney PC

(57) ABSTRACT

A damping force adjusting mechanism includes: a case housing an operating fluid; a sealing member separating an inside of the case into first and second fluid chambers; a housing holding the sealing member and housing the sealing member in the case; a damping valve housed inside the housing and controlling the first and second fluid chambers; first and second pilot chambers formed inside the housing; first and second communication passages communicating the first and second fluid chambers with the first and second pilot chambers; first and second fixed orifices interposed in the first and second communication passages; a control chamber formed inside the housing and communicating with the first and second pilot chambers; a control valve housed inside the control chamber, separating the control chamber into first and second control chambers, and selecting a flow of the fluid; and an actuator controlling the control valve and a fluid pressure.

11 Claims, 5 Drawing Sheets

(56) References Cited

U.S. PATENT DOCUMENTS

| | | | |
|---|---|---|---|
| 2004/0188200 A1* | 9/2004 | Katayama | F16F 9/465 188/322.15 |
| 2009/0020382 A1* | 1/2009 | Van Weelden | F16F 9/465 188/282.2 |
| 2011/0168935 A1* | 7/2011 | Heyn | F16F 9/46 251/321 |
| 2012/0273311 A1* | 11/2012 | Beck | F16F 9/464 188/322.15 |
| 2013/0341540 A1* | 12/2013 | Manger | F16F 9/46 251/30.01 |

* cited by examiner

DAMPING FORCE ADJUSTING MECHANISM

CROSS REFERENCE TO RELATED APPLICATIONS

This application is based on and claims priority under 35 U.S.C. § 119 to Japanese Patent Application 2015-215139, filed on Oct. 30, 2015, the entire contents of which are incorporated herein by reference.

TECHNICAL FIELD

This disclosure relates to a damping force adjusting mechanism, in particular, a damping force adjusting mechanism suitable for a shock absorber of an automobile.

BACKGROUND DISCUSSION

A shock absorber mounted on a vehicle may have a damping force adjusting mechanism. The mechanism does not allow sufficient riding comfort and steering safety which have a mutually opposing relationship because of being a shock absorber of which a damping force is uniquely determined with respect to an operating speed of a piston. Therefore, various types of damping force adjusting mechanism, in which the generated damping force is adjustable by the piston, are known. For example, Japanese Patent No. 3103062 (Reference 1) discloses "a vibration damper which includes a cylinder that has a damping fluid; a piston rod that is inserted into the cylinder and is sealed in and is movably disposed in an axial direction; a damping piston that is fixed to the piston rod and divides the cylinder into two operating chambers; and a damping valve that adjusts a cross-section of a damping duct of a main stage that functions due to having a valve body movable in the axial direction and includes a valve seat, and is adjustable for a motor vehicle. A valve element that is movable in the axial direction is disposed for positioning the valve body in one direction and the valve element urges the valve body to a rear side with a pressure of the damping fluid flowing therein from an operating chamber through a flow communicating portion having a throttle in a vibration damper that is adjustable for the motor vehicle. Therefore, the valve element creates a pilot control operation with respect to the valve body in the direction, the valve body is directly urged in the other direction, and the valve body is urged by a pressure of the damping fluid of the corresponding operating chamber." (described in claim 1 of Reference 1 and omitting reference numerals quoted in figures).

In addition, Japanese Patent No. 4985984 (Reference 2) has an object to "provide a damping force adjusting type shock absorber which is able to generate a damping force that is stable even during actuator failure" and proposes a damping force adjusting type shock absorber "which includes a cylinder in which a fluid is sealed; a piston that is slidably provided within the cylinder; a piston rod that is connected to the piston and extends from the cylinder to the outside; a passage that causes the fluid to flow by the sliding of the piston within the cylinder; a pilot type damping valve that generates a damping force by controlling the flow of the fluid in the passage and adjusts a valve opening pressure using some flow of the fluid as a pilot pressure; a damping force adjusting valve that adjusts the damping force by controlling some flow of the fluid and adjusting the pilot pressure; and an actuator that operates the damping force adjusting valve, in which the damping force adjusting valve limits the flow of the fluid during actuator failure, a relief valve is provided in parallel with the damping force adjusting valve, and a sub-damping valve for controlling the flow of the fluid is provided on a downstream side of the relief valve" (described in paragraphs [0010] and [0011] of Reference 2).

In the vibration damper described in Reference 1 described above, a mechanism, in which the damping force is variable by driving the valve body by the actuator, is disclosed. However, a control valve is disposed on the damping valve and the pilot pressure control is possible with respect to the flow of the fluid in one direction, but the flow of the fluid in a reverse direction is controlled by direct driving of the actuator. Therefore, the damping force is forced to be either a maximum or minimum during failure. In contrast, if a structure including two damping valves is provided, the pilot pressure control is possible with respect to a bi-directional flow of the fluid and, as described in Reference 2, damping force characteristics during failure can be arbitrarily set, but the number of components increases, a structure becomes large and complicated, and an increase in costs is caused.

SUMMARY

Thus, a need exists for a damping force adjusting mechanism which is not suspectable to the drawback mentioned above.

An aspect of this disclosure is directed to a damping force adjusting mechanism including a case that houses an operating fluid; a sealing member that separates an inside of the case into a first fluid chamber and a second fluid chamber; a housing that holds the sealing member and houses the sealing member in the case; a damping valve that is housed inside the housing and performs control of opening and closing between the first fluid chamber and the second fluid chamber; a first pilot chamber and a second pilot chamber which are separately formed inside the housing with the damping valve therebetween; a first communication passage that causes the first fluid chamber to communicate with the first pilot chamber; a second communication passage that causes the second fluid chamber to communicate with the second pilot chamber; a first fixed orifice that is interposed in the first communication passage; a second fixed orifice that is interposed in the second communication passage; a control chamber that is formed inside the housing and communicates with the first pilot chamber and the second pilot chamber; a control valve that is housed inside the control chamber, separates the control chamber into a first control chamber communicating with the first pilot chamber and a second control chamber communicating with the second pilot chamber, and selects a flow of the fluid from the first control chamber to the second control chamber or a flow of the fluid in a reverse direction with respect to the flow of the fluid in accordance with magnitudes of fluid pressures inside the first control chamber and the second control chamber; and an actuator that controls electrical driving of the control valve and controls the fluid pressure inside the first pilot chamber or the second pilot chamber.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
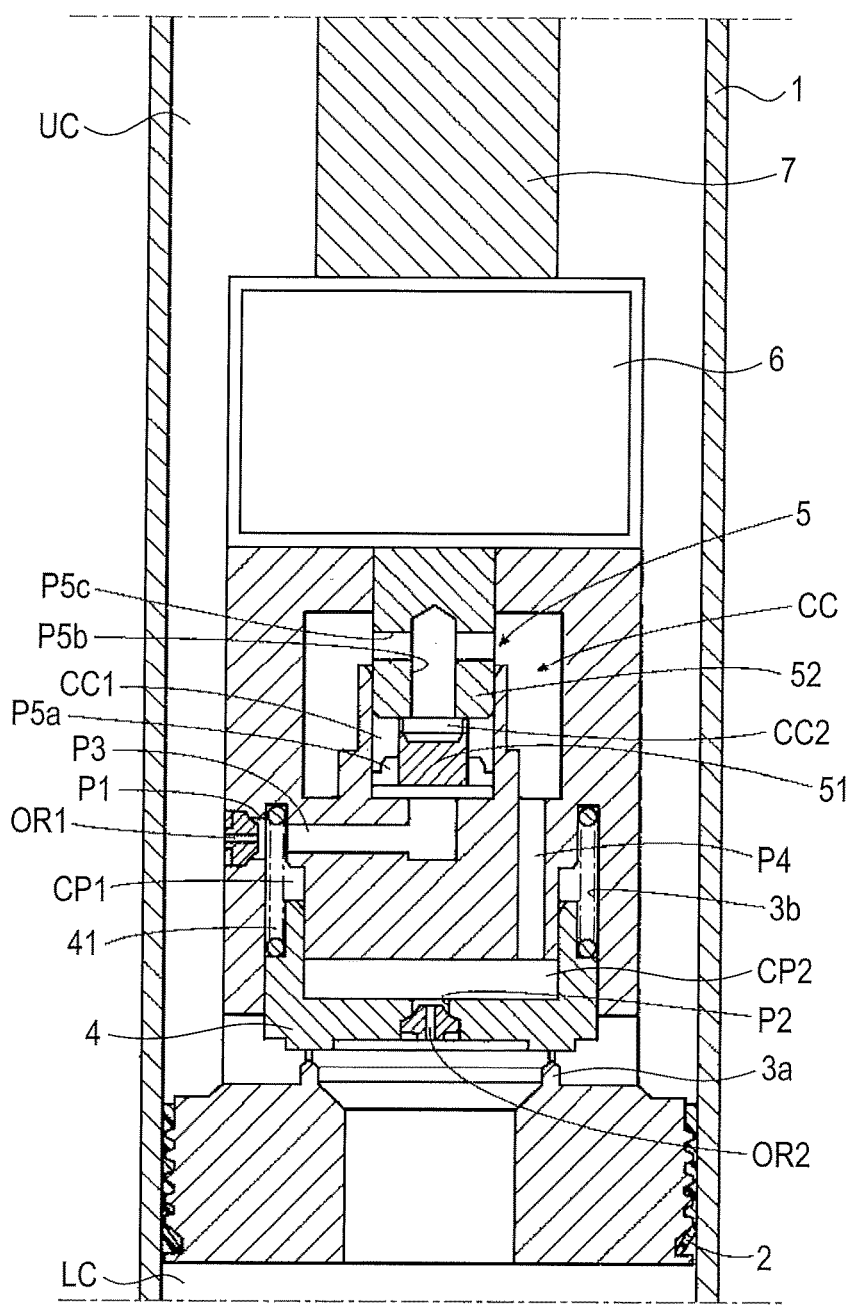
FIG. 1 is a sectional view of a damping force adjusting mechanism according to an embodiment disclosed here.

Hereinafter, preferable embodiments will be described with reference to the drawings. FIG. 1 illustrates a damping force adjusting mechanism according to an embodiment disclosed here and the damping force adjusting mechanism is provided in, for example, a shock absorber of an automobile. In the embodiment, a housing 3 (corresponding to a piston of the shock absorber) is housed in a case 1 (corresponding to a cylindrical body of the shock absorber) housing an operating fluid via a sealing member 2, an inside of the case 1 is separated into a first fluid chamber UC (corresponding to an upper chamber of the shock absorber) and a second fluid chamber LC (corresponding to a lower chamber of the shock absorber) by the sealing member 2, and an actuator 6 and a rod 7 are joined to the housing 3. A damping valve 4 for controlling opening and closing between the first fluid chamber UC and the second fluid chamber LC is housed inside the housing 3. Then, a first pilot chamber CP1 and a second pilot chamber CP2 are separately formed inside the housing 3 with the damping valve 4 therebetween. A first communication passage P1 causing the first fluid chamber UC to communicate with the first pilot chamber CP1 and a second communication passage P2 causing the second fluid chamber LC to communicate with the second pilot chamber CP2 are formed inside the housing 3. In the embodiment, a first fixed orifice OR1 (hereinafter, simply referred to as the orifice OR1) is interposed in the first communication passage P1 and a second fixed orifice OR2 (hereinafter, simply referred to as the orifice OR2) is interposed in the second communication passage P2. In addition, the orifices OR1 and OR2 are not necessarily to be formed as separate members and may be integrally formed with the housing 3.

In the embodiment, an annular valve seat portion 3a is formed on a second fluid chamber LC side of the housing 3 and the damping valve 4 is formed in a cylindrical cup shape having a bottom. The damping valve 4 is housed inside the housing 3 such that a bottom surface thereof is able to be seated by abutting against the valve seat portion 3a and is supported to be slidable in a predetermined distance in an axial direction. In addition, a damping valve spring 41 of a compression coil spring is housed in an annular groove 3b formed inside the housing 3 and is stretched between a bottom portion of the annular groove 3b and a side wall of the damping valve 4. Then, the second communication passage P2 is formed in a bottom portion of the damping valve 4 and the orifice OR2 is fitted in an opening portion thereof. Thus, the first pilot chamber CP1 (hereinafter, simply referred to as the pilot chamber CP1) having a variable volume is formed between a side wall end surface of the damping valve 4 and the housing 3 (annular groove 3b) and the second pilot chamber CP2 (hereinafter, simply referred to as the pilot chamber CP2) having a variable volume is formed between an inner surface of the damping valve 4 and the housing 3.

Furthermore, a control chamber CC communicating with the pilot chambers CP1 and CP2 is formed inside the housing 3, a control valve 5 is housed inside the control chamber CC, and the control chamber CC is separated into a first control chamber CC1 communicating with the pilot chamber CP1 and a second control chamber CC2 communicating with the pilot chamber CP2. A flow of a fluid from the first control chamber CC1 to the second control chamber CC2 or a flow of the fluid in a reverse direction is selected in accordance with magnitudes of the fluid pressures inside the first control chamber CC1 and inside the second control chamber CC2 by the control valve 5. The control valve 5 is controlled in electric drive by the actuator 6 and is configured such that the fluid pressure inside the pilot chamber CP1 or CP2 is controlled. In addition, the housing 3 is usually configured by joining a plurality of members such that each chamber and each communication passage are formed, but is illustrated as an integral member in FIG. 1 for the sake of easiness of description.

The control valve 5 of the embodiment is provided in the housing 3, includes a first member 51 disposed on a first control chamber CC1 side and a second member 52 disposed on a second control chamber CC2 side so as to abut against the first member, and is configured such that the second member 52 is driven by the actuator 6 in the axial direction (vertical direction in FIG. 1). The first member 51 is provided with a flow passage P5a causing the first control chamber CC1 to communicate with the pilot chamber CP1 (via a communication passage P3 in FIG. 1) and the second member 52 is provided with flow passages P5b and P5c causing the second control chamber CC2 to communicate with the pilot chamber CP2 (via a communication passage P4 in FIG. 1). The first control chamber CC1 and the second control chamber CC2 are able to communicate with each other via a gap between the first member 51 and the second member 52 that is formed by a pressure difference therebetween.

As illustrated in FIG. 1, the first member 51 and the second member 52 have the same diameter, the flow passage P5a is formed in the first member 51, and the flow passage P5b (and P5c) is formed in the second member 52. In addition, an annular upright wall is formed on an upper end surface of the first member 51 and the first control chamber CC1 is formed outside the upright wall. If the upright wall of the first member 51 abuts against a lower end surface of the second member 52, the second control chamber CC2 is formed therebetween (communicates with the flow passages P5b and P5c). Therefore, even in a case where the direction of the flow of the fluid is either from the first member 51 to the second member 52 or vise versa, pressure receiving areas of both members are different and a gap is formed therebetween by the pressure difference therebetween by the fluid. Furthermore, as described below, a return spring (53 described in FIG. 4) may be interposed between the first member 51 and the second member 52 to bias the members in a direction in which a gap therebetween widens. In addition, since the actuator 6 is usually configured to include a linear solenoid (not illustrated) mounted on the housing 3 and a plunger (not illustrated) for driving the second member 52 in accordance with excitation of the linear solenoid, description thereof will be omitted.

An operation of the damping force adjusting mechanism having the configuration described above will be described. If the rod 7 is, for example, pulled upward (for example, an expanding operation of the shock absorber) of FIG. 1 from a solenoid excitation state of the actuator 6 illustrated in FIG. 1 and the housing 3 begins to compress the inside of the first fluid chamber UC, the fluid inside the first fluid chamber UC is introduced into the first communication passage P1 via the orifice OR1 (due to pressure loss). As indicated by a thin line arrow (f1) in FIG. 2, the fluid is discharged on the second fluid chamber LC side via the pilot chamber CP1, the communication passage P3, the first control chamber CC1, the gap between the first and second members 51 and 52, the second control chamber CC2, the communication passage P4, the pilot chamber CP2, the second communication passage P2, and the orifice OR2. In addition, in FIG. 2 (and FIG. 3), since extension lines intersect the arrow indicating the flow of the fluid, a part of the reference numerals illustrated in FIG. 1 is omitted.

Figure 2:
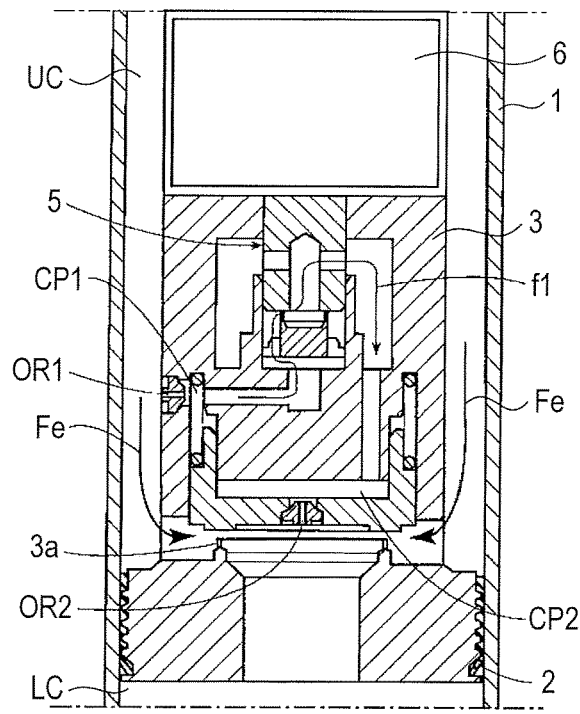
FIG. 2 is a sectional view illustrating an expanding operation state of the damping force adjusting mechanism according to an embodiment disclosed here.
Figure 3:
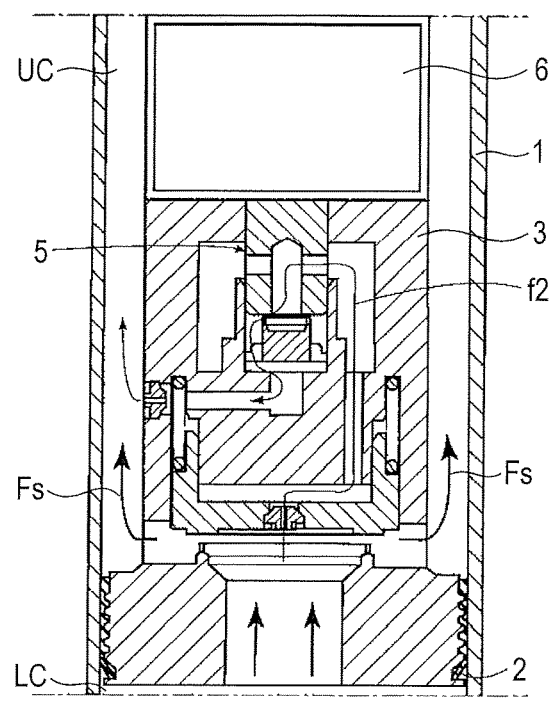
FIG. 3 is a sectional view illustrating a contracting operation state of the damping force adjusting mechanism according to an embodiment disclosed here.

If a flow rate of the fluid introduced from the first fluid chamber UC side into the housing 3 is increased as a rising speed of the rod 7 (and hence the housing 3) is increased, the damping valve 4 is unseated from the valve seat portion 3a against a biasing force of the damping valve spring 41 by the pressure difference of the fluid applied to both surfaces of the bottom portion of the damping valve 4 and, as indicated by bold line arrows (Fe) in FIG. 2, the fluid is discharged from the gap therebetween to the second fluid chamber LC side. In this case, the control valve 5 is driven by the actuator 6 and thereby a pressure inside the pilot chamber CP1 is controlled. Therefore, a pressure for opening valve of the damping valve 4 is variably controlled and is adjusted to desired damping force characteristics (pressure-flow rate characteristics).

In contrast, if the rod 7 is pulled downward in FIG. 1 (for example, a contacting operation of the shock absorber) and the housing 3 begins to compress the inside of the second fluid chamber LC, the fluid inside the second fluid chamber LC is introduced into the second communication passage P2 via the orifice OR2 (due to pressure loss). As indicated by thin line arrows (f2) in FIG. 3, the fluid is discharged to the first fluid chamber UC side via the pilot chamber CP2, the communication passage P4, the second control chamber CC2, the gap between the first and second members 51 and 52, the first control chamber CC1, the communication passage P3, the pilot chamber CP1, the first communication passage P1, and the orifice OR1.

If the flow rate of the fluid introduced from the second fluid chamber LC into the housing 3 is increased as a lowering speed of the rod 7 (housing 3) is increased, the damping valve 4 is unseated from the valve seat portion 3a against the biasing force of the damping valve spring 41 by the pressure difference of the fluid applied to both surfaces of the bottom portion of the damping valve 4. As indicated by bold line arrows (Fs) in FIG. 3, the fluid is discharged from the gap therebetween to the first fluid chamber UC side. Also, in this case, the control valve 5 is driven by the actuator 6 and thereby the pressure inside the pilot chamber CP2 is controlled. Therefore, the pressure for opening valve of the damping valve 4 is variably controlled and is adjusted to desired pressure-flow rate characteristics.

FIGS. 4 to 8 illustrate a damping force adjusting mechanism according to another embodiment disclosed here. In the embodiment, a first relief valve 8, which includes a valve member 81 having an orifice OR1 and being seated on an opening portion of a first communication passage P1, and a relief spring 82 facing the valve member 81 and biasing the opening portion of the first communication passage P1 in a direction of closing the opening portion thereof, is disposed in the damping force adjusting mechanism. Similarly, a second relief valve 9, which includes a valve member 91 having an orifice OR2 and being seated on an opening portion of a second communication passage P2, and a relief spring 92 facing the valve member 91 and biasing the opening portion of the second communication passage P2 in a direction of closing the opening portion thereof, is disposed in the damping force adjusting mechanism. That is, when the fluid introduced into the housing 3 is discharged, it is preferable that a pressure loss due to the orifices OR1 and OR2 does not occur. Therefore, the first and second relief valves 8 and 9 are disposed such that when the fluid is discharged, the valve members 81 and 91 are opened by a pressure difference applied to the valve members 81 and 91 against biasing forces of the relief springs 82 and 92, a flow passage area is increased (therefore, a flow passage resistance is decreased).

In addition, as described above, the first member 51 and the second member 52 are configured such that the gap is formed therebetween by the pressure difference therebetween, but in the embodiment, a return spring 53 biasing the first member 51 and the second member 52 in a direction in which a gap therebetween widens is interposed between the first member 51 and the second member 52. Therefore, the gap described above is formed immediately after the pressure difference described above occurs using the actuator 6 from a state where both of the first member 51 and the second member 52 abut against each other.

Furthermore, in the embodiment, a cylindrical holding member 55, which is integrally formed with the first member 51 and slidably houses the second member 52, is housed inside a control chamber CC. A control spring 56 is interposed between the holding member 55 and the housing 3, and biases them in a direction in which a gap therebetween closes. As can be seen in the following description, this is set to different pressure-flow rate characteristics in accordance with the flow of the fluid introduced into the housing 3. Since the other configurations are the same as those of the embodiment described above, the same reference numerals are given to substantially the same members and the description will be omitted.

Figure 5:
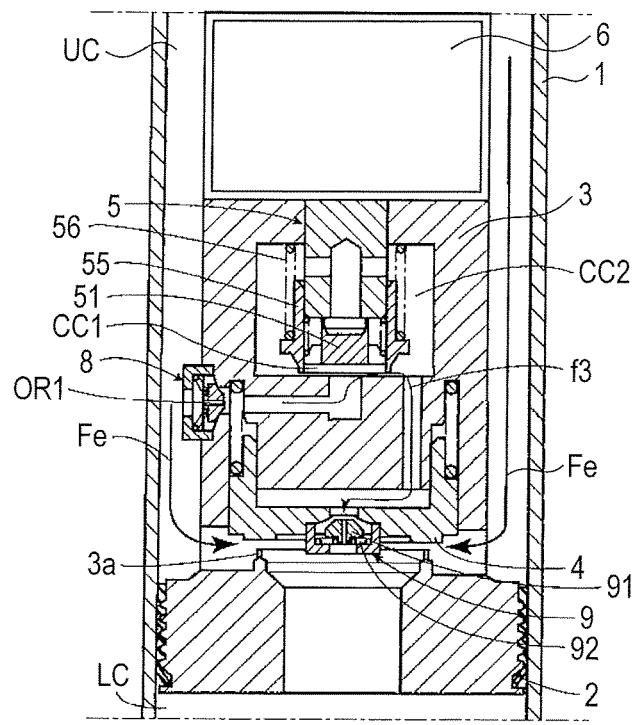
FIG. 5 is a sectional view illustrating an expanding operation state of the damping force adjusting mechanism according to another embodiment disclosed here.
Figure 6:
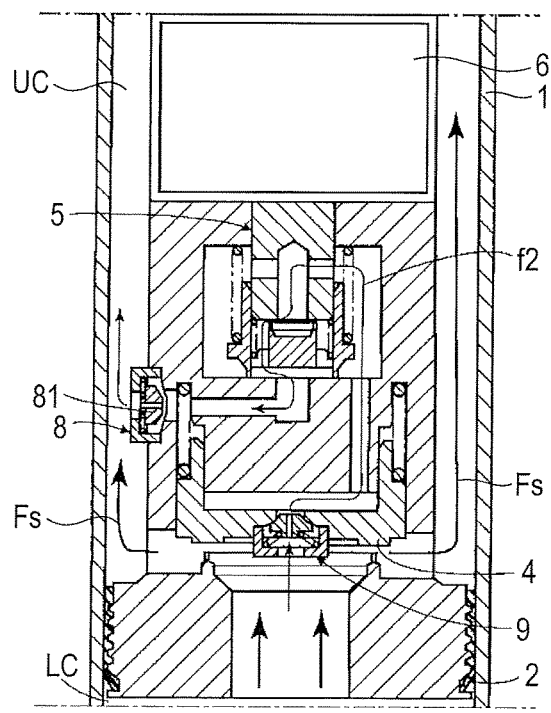
FIG. 6 is a sectional view illustrating a contracting operation state of the damping force adjusting mechanism according to another embodiment disclosed here.

Thus, in the embodiment, as illustrated in FIG. 5, if the rod 7 is pulled upward (expanding operation of the shock absorber) and the housing 3 begins to compress the inside of the first fluid chamber UC, the fluid inside the first fluid chamber UC is introduced into the first communication passage P1 via the orifice OR1 of the first relief valve 8 of a state where the fluid inside the first fluid chamber UC is closed. As indicated by a thin line arrow (f3) in FIG. 5, the fluid is discharged on the second fluid chamber LC side via the pilot chamber CP1, the communication passage P3, the first control chamber CC1, a gap between the holding member 55 and the housing 3, the second control chamber CC2, the communication passage P4, the pilot chamber CP2, the second communication passage P2, and the second relief valve 9. In this case, as illustrated in FIG. 5, the valve member 91 of the second relief valve 9 is in a valve opening state against a biasing force of the relief spring 92.

Figure 4:
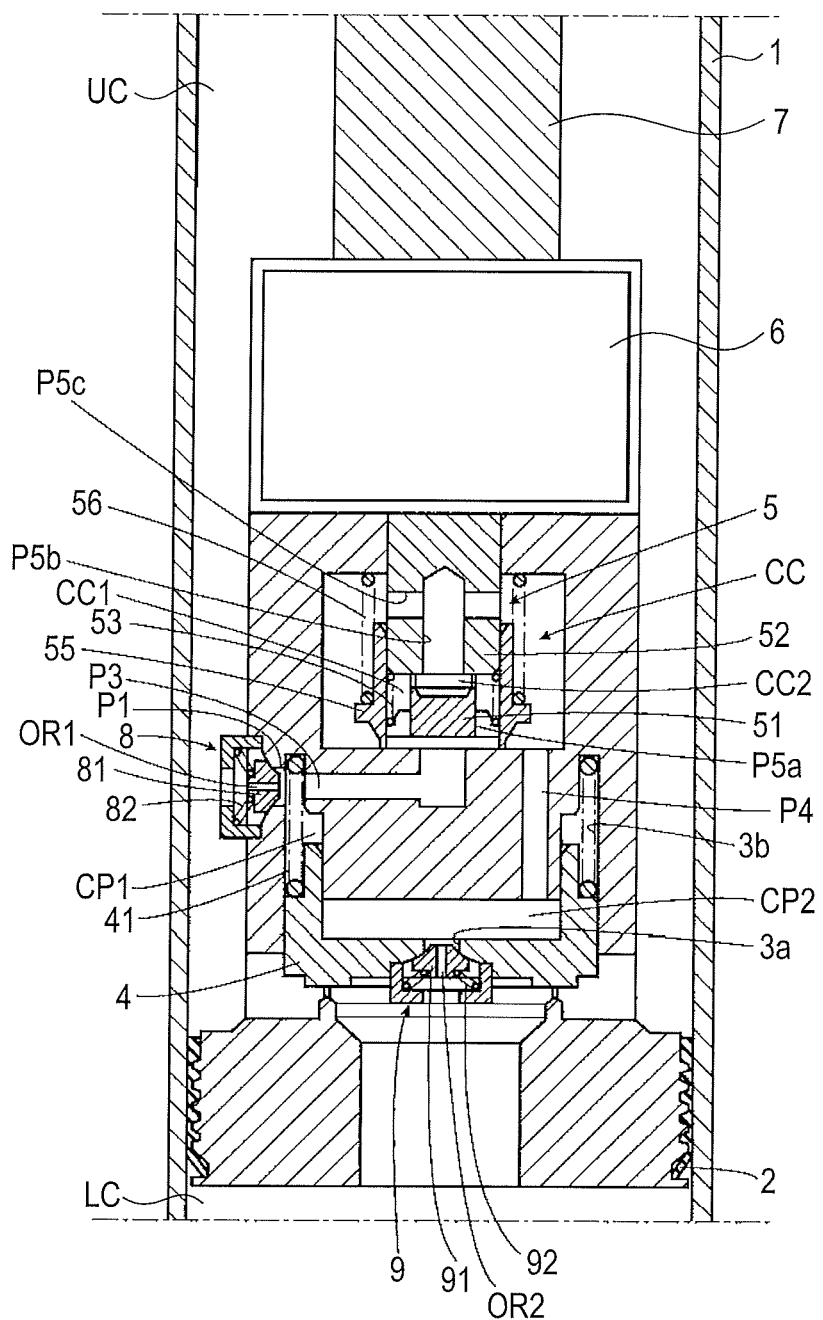
FIG. 4 is a sectional view of a damping force adjusting mechanism according to another embodiment disclosed here.

Meanwhile, if the rod 7 is pulled downward (contacting operation of the shock absorber) and the housing 3 begins to compress the inside of the second fluid chamber LC, the fluid inside the second fluid chamber LC is introduced into the second communication passage P2 via the orifice OR2 of the second relief valve 9. As indicated by thin line arrows (f2) in FIG. 6, the fluid is discharged to the first fluid chamber UC side via the pilot chamber CP2, the communication passage P4, the second control chamber CC2, the gap between the first and second members 51 and 52, the first control chamber CC1, the communication passage P3, the pilot chamber CP1, the first communication passage P1, and the first relief valve 8 (valve member 81 is in the valve opening state). In addition, also in FIGS. 5 and 6, since extension lines intersect the arrows indicating the flow of the fluid, a part of the reference numerals illustrated in FIG. 4 is omitted.

Thus, different pressure-flow rate characteristics are provided when the rod 7 begins the expanding operation for being pulled upward and begins the contacting operation for being pulled downward, and it is possible to set to initial characteristics suitable for each operation. In addition, thereafter, the operation according to a speed increase of the rod 7 is the same as that of the embodiment described above. That is, if the flow rate of the fluid introduced from the first fluid chamber UC into the housing 3 is increased, the damping valve 4 is unseated from the valve seat portion 3a against the biasing force of the damping valve spring 41 by the pressure difference of the fluid applied to both surfaces of the bottom portion of the damping valve 4. As indicated by bold line arrows (Fe) in FIG. 5, the fluid is discharged from the gap therebetween to the second fluid chamber LC side. In this case, the control valve 5 is driven by the actuator 6 and thereby the pressure inside the pilot chamber CP1 is controlled. Therefore, the pressure for opening valve of the damping valve 4 is variably controlled. On the other hand, if the flow rate of the fluid introduced from the second fluid chamber LC into the housing 3 is increased, the damping valve 4 is unseated from the valve seat portion 3a against the biasing force of the damping valve spring 41 by the pressure difference of the fluid applied to both surfaces of the bottom portion of the damping valve 4. As indicated by bold line arrows (Fs) in FIG. 6, the fluid is discharged from the gap therebetween to the first fluid chamber UC side. In addition, the control valve 5 is driven by the actuator 6 and thereby the pressure inside the pilot chamber CP2 is controlled. Therefore, the pressure for opening valve of the damping valve 4 is variably controlled.

Figure 7:
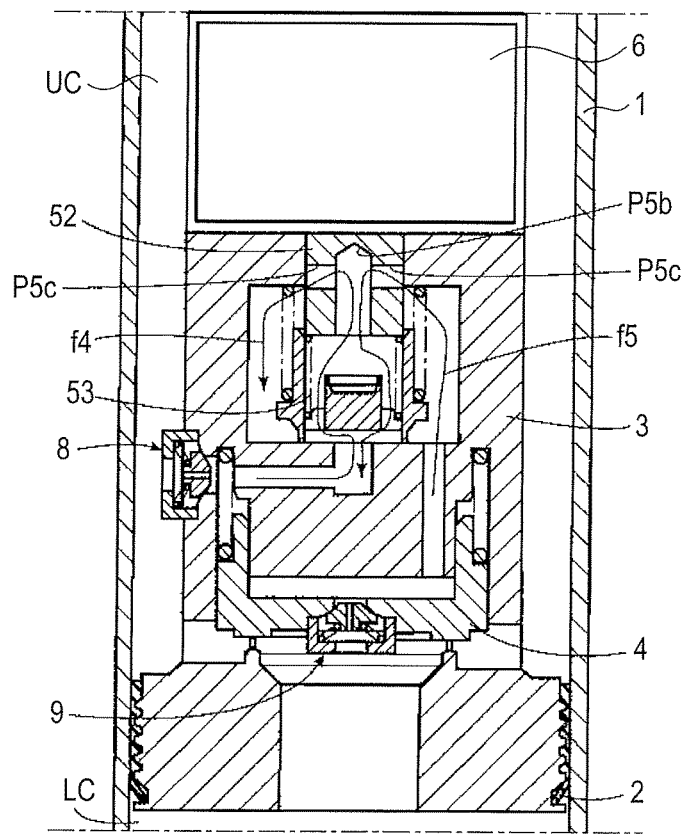
FIG. 7 is a sectional view illustrating a state during failure of the damping force adjusting mechanism according to another embodiment disclosed here.

FIG. 7 illustrates a state during failure in the embodiment described above. A flow passage area of a flow passage P5c in the second member 52 of the control valve 5 is reduced during non-excitation of a linear solenoid (not illustrated) of the actuator 6 more than during excitation of the linear solenoid illustrated in FIG. 4. That is, during non-excitation (failure) of the linear solenoid, the second member 52 (and a plunger (not illustrated)) is pushed upward in FIG. 7 by the return spring 53, the flow passage P5c is configured so as to be closed except for a part thereof by a wall surface of the housing 3, and a portion in which the flow passage area is reduced functions as an orifice. Therefore, it is possible to arbitrary set a pilot pressure during failure. In addition, a communication state is maintained via the flow passages P5b and P5c even during failure. Therefore, even when the rod 7 begins the expanding operation for being pulled upward and begins the contacting operation for being pulled downward, it is possible to ensure the flow (indicated by the thin line arrows (f4) and (f5)) of the fluid via the same flow passages P5b and P5c.

Figure 8:
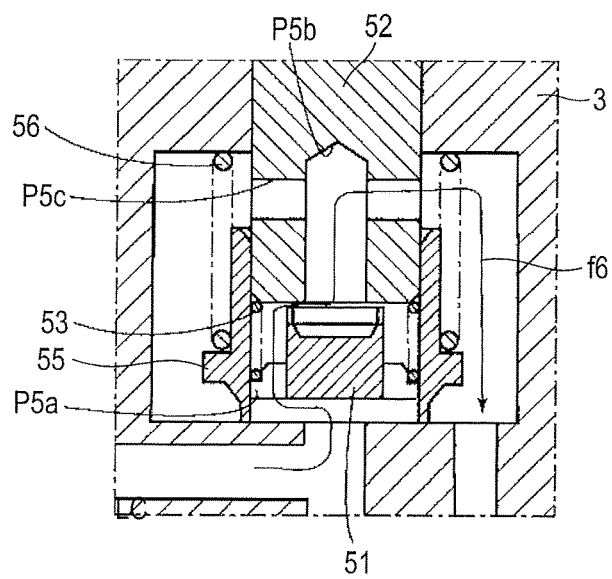
FIG. 8 is an enlarged sectional view illustrating a part of the damping force adjusting mechanism according to another embodiment disclosed here.

In FIG. 8, in the embodiment described above, in a case where a small thrust is set with respect to the plunger (second member 52) by the actuator 6, similar to during failure described above, the second member 52 is pushed upward in FIG. 8 by the return spring 53 and the gap is generated between the first member 51 and the second member 52 (that is, the control valve 5 is opened). Therefore, the flow (indicated by a thin line arrow (f6)) of the fluid via the flow passages P5b and P5c is ensured. Thus, since the control valve 5 is opened from a state where the flow rate is 0, it is possible to set the damping force to be further lowered.

In each embodiment described above, there is provided the damping force adjusting mechanism suitable for the shock absorber in which the case 1 is configured in the cylindrical body of the shock absorber that houses the operating fluid, and the housing 3 and the sealing member 2 are respectively configured of the piston which slidably moves inside the cylindrical body and separates the inside of the cylindrical body into the first fluid chamber UC (upper chamber) and the second fluid chamber LC (lower chamber), and the sealing member which is mounted on the piston, the operating fluid flowing via the piston inside the cylindrical body is controlled, and the damping force is adjusted. However, the damping force adjusting mechanism is not limited to the shock absorber, is not limited to the shock absorber for an automobile, and can be applied to various dampers, a separate pressure device and the like.

An aspect of this disclosure is directed to a damping force adjusting mechanism including a case that houses an operating fluid; a sealing member that separates an inside of the case into a first fluid chamber and a second fluid chamber; a housing that holds the sealing member and houses the sealing member in the case; a damping valve that is housed inside the housing and performs control of opening and closing between the first fluid chamber and the second fluid chamber; a first pilot chamber and a second pilot chamber which are separately formed inside the housing with the damping valve therebetween; a first communication passage that causes the first fluid chamber to communicate with the first pilot chamber; a second communication passage that causes the second fluid chamber to communicate with the second pilot chamber; a first fixed orifice that is interposed in the first communication passage; a second fixed orifice that is interposed in the second communication passage; a control chamber that is formed inside the housing and communicates with the first pilot chamber and the second pilot chamber; a control valve that is housed inside the control chamber, separates the control chamber into a first control chamber communicating with the first pilot chamber and a second control chamber communicating with the second pilot chamber, and selects a flow of the fluid from the first control chamber to the second control chamber or a flow of the fluid in a reverse direction with respect to the flow of the fluid in accordance with magnitudes of fluid pressures inside the first control chamber and the second control chamber; and an actuator that controls electrical driving of the control valve and controls the fluid pressure inside the first pilot chamber or the second pilot chamber.

The damping force adjusting mechanism may further include a first relief valve that has a valve member having the first fixed orifice and being seated on an opening portion of the first communication passage, and a relief spring for biasing the valve member in a direction of closing the opening portion of the first communication passage; and a second relief valve that has a valve member having a second fixed orifice and being seated on an opening portion of the second communication passage, and a relief spring for biasing the valve member in a direction of closing the opening portion of the second communication passage.

The control valve may include a first member that is provided in the housing, is disposed on a first control chamber side, and has a flow passage causing the first control chamber to communicate with the first pilot chamber; and a second member that is disposed on a second control chamber side so as to abut against the first member, has a flow passage causing the second control chamber to communicate with the second pilot chamber, and is driven by the actuator, and the control valve may be configured such that the first control chamber and the second control chamber are able to communicate with each other via a gap between the second member and the first member.

The control valve may include a first member that is disposed on a first control chamber side and has a flow passage causing the first control chamber to communicate with the first pilot chamber; a second member that is disposed on a second control chamber side so as to abut against the first member, has a flow passage causing the second control chamber to communicate with the second pilot chamber, and is driven by the actuator; and a holding member that is housed inside the control chamber, slidably houses the second member, and is formed integrally with the first member, and the control valve may be configured such that the first control chamber and the second control chamber are able to communicate with each other via a gap between the holding member and the housing, or a gap between the second member and the first member.

The damping force adjusting mechanism may further include a return spring that is interposed between the first member and the second member, and urges the first member and the second member in a direction in which a gap therebetween widens. In addition, the damping force adjusting mechanism may further include a control spring that is interposed between the holding member and the housing, and urges the holding member and the housing in a direction in which a gap therebetween closes. Furthermore, the actuator may include a linear solenoid that is mounted on the housing and a plunger that drives the second member in accordance with excitation of the linear solenoid, and may be configured such that a flow passage area of the flow passage in the second member is reduced during non-excitation of the linear solenoid compared to that during the excitation thereof.

In the damping force adjusting mechanism, the case may be configured of a cylindrical body that houses the operating fluid and the housing and the sealing member may be respectively configured of a piston that slidably moves inside the cylindrical body and separates the inside of the cylindrical body into an upper chamber that is the first fluid chamber and a lower chamber that is the second fluid chamber; and a sealing member mounted on the piston, and the damping force adjusting mechanism may be configured so as to control the operating fluid flowing inside the cylindrical body via the piston and to adjust the damping force.

Since the aspect of this disclosure is configured as described above, the following advantages are exhibited. That is, the damping force adjusting mechanism of this disclosure includes the damping valve that is housed inside the housing and performs control of opening and closing between the first fluid chamber and the second fluid chamber; the first pilot chamber and the second pilot chamber which are separately formed inside the housing with the damping valve therebetween; the first communication passage that causes the first fluid chamber to communicate with the first pilot chamber; the second communication passage that causes the second fluid chamber to communicate with the second pilot chamber; the first fixed orifice that is interposed in the first communication passage; the second fixed orifice that is interposed in the second communication passage; the control chamber that is formed inside the housing and communicates with the first pilot chamber and the second pilot chamber; the control valve that is housed inside the control chamber, separates the control chamber into the first control chamber communicating with the first pilot chamber and the second control chamber communicating with the second pilot chamber, and selects the flow of the fluid from the first control chamber to the second control chamber or the flow of the fluid in the reverse direction with respect to the flow of the fluid in accordance with the magnitudes of the fluid pressures inside the first control chamber and the second control chamber; and the actuator that controls the electrical driving of the control valve and controls the fluid pressure inside the first pilot chamber or the second pilot chamber. Thus, desired damping force characteristics are able to be obtained by the pilot pressure control with respect to a bi-directional flow of the fluid with a simple configuration having a single damping valve.

In the damping force adjusting mechanism described above, if the first relief valve that has the valve member having the first fixed orifice and being seated on an opening portion of the first communication passage, and a relief spring for biasing the valve member in a direction of closing the opening portion of the first communication passage; and the second relief valve that has the valve member having the second fixed orifice and being seated on the opening portion of the second communication passage, and the relief spring for biasing the valve member in the direction of closing the opening portion of the second communication passage are provided, the first and second relief valves function as the fixed orifices with respect to the flow of the fluid in one direction and can cause the valve member to be an open state due to a pressure difference with respect to the flow of the fluid in the reverse direction. Thus, it is possible to perform smooth pilot pressure control.

The control valve includes the first member that is provided in the housing, is disposed on the first control chamber side, and has the flow passage causing the first control chamber to communicate with the first pilot chamber; and the second member that is disposed on the second control chamber side so as to abut against the first member, has the flow passage causing the second control chamber to communicate with the second pilot chamber, and is driven by the actuator, and the control valve is configured such that the first control chamber and the second control chamber are able to communicate with each other via the gap between the second member and the first member. Therefore, it is possible to perform stable pilot pressure control with a simple valve structure.

Otherwise, the control valve includes the first member that is disposed on the first control chamber side and has the flow passage causing the first control chamber to communicate with the first pilot chamber; the second member that is disposed on the second control chamber side so as to abut against the first member, has the flow passage causing the second control chamber to communicate with the second pilot chamber, and is driven by the actuator; and the holding member that is housed inside the control chamber, slidably houses the second member, and is formed integrally with the first member, and the control valve is configured such that the first control chamber and the second control chamber are able to communicate with each other via the gap between the holding member and the housing, or the gap between the second member and the first member. Therefore, it is possible to set the bi-directional flows of the fluid to initial characteristics suitable for each thereof.

Furthermore, if the return spring that is interposed between the first member and the second member, and urges the first member and the second member in the direction in which a gap therebetween widens is provided, when a pressure difference occurs on the first control chamber side and the second control chamber side, it is possible to configure the relief spring to immediately form the gap. In addition, in a case where a small thrust is set with respect to the second member by the actuator, it is possible to set a lower damping force. In addition, if the control spring that is interposed between the holding member and the housing, and urges the holding member and the housing in the direction in which a gap therebetween closes is provided, it is possible to perform stable pilot pressure control. Furthermore, the actuator includes the linear solenoid that is mounted on the housing and the plunger that drives the second member in accordance with the excitation of the linear solenoid, and is configured such that the flow passage area of the flow passage in the second member is reduced during the non-excitation of the linear solenoid compared to that during the excitation thereof. Therefore, a portion in which the flow passage area is reduced functions as the orifice. Thus, it is possible to arbitrarily set the pilot pressure during failure.

In the damping force adjusting mechanism described above, the case is configured of the cylindrical body that houses the operating fluid and the housing and the sealing member is respectively configured of the piston that slidably moves inside the cylindrical body and separates the inside of the cylindrical body into the upper chamber that is the first fluid chamber and the lower chamber that is the second fluid chamber; and the sealing member mounted on the piston, and the damping force adjusting mechanism is configured so as to control the operating fluid flowing inside the cylindrical body via the piston and to adjust the damping force. Therefore, it is possible to provide a damping force adjusting mechanism suitable for a shock absorber of an automobile.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A damping force adjusting mechanism comprising:
   a case that houses an operating fluid;
   a sealing member that separates an inside of the case into a first fluid chamber and a second fluid chamber;
   a housing that holds the sealing member and houses the sealing member in the case;
   a damping valve that is housed inside the housing and performs control of opening and closing between the first fluid chamber and the second fluid chamber;
   a first pilot chamber and a second pilot chamber which are separately formed inside the housing with the damping valve therebetween;
   a first communication passage that causes the first fluid chamber to communicate with the first pilot chamber;
   a second communication passage that causes the second fluid chamber to communicate with the second pilot chamber;
   a first fixed orifice that is interposed in the first communication passage;
   a second fixed orifice that is interposed in the second communication passage;
   a control chamber that is formed inside the housing and communicates with the first pilot chamber and the second pilot chamber;
   a control valve that is housed inside the control chamber, separates the control chamber into a first control chamber communicating with the first pilot chamber and a second control chamber communicating with the second pilot chamber, and selects a flow of the fluid from the first control chamber to the second control chamber or a flow of the fluid in a reverse direction with respect to the flow of the fluid in accordance with magnitudes of fluid pressures inside the first control chamber and the second control chamber;
   an actuator that controls electrical driving of the control valve and controls the fluid pressure inside the first pilot chamber or the second pilot chamber;
   a first relief valve that has a valve member having the first fixed orifice and being seated on an opening portion of the first communication passage, and a relief spring for biasing the valve member in a direction of closing the opening portion of the first communication passage; and
   a second relief valve that has a valve member having the second fixed orifice and being seated on an opening portion of the second communication passage, and a relief spring for biasing the valve member in a direction of closing the opening portion of the second communication passage.

2. The damping force adjusting mechanism according to claim 1,
   wherein the control valve includes a first member that is provided in the housing, is disposed on a first control chamber side, and has a flow passage causing the first control chamber to communicate with the first pilot chamber; and a second member that is disposed on a second control chamber side so as to abut against the first member, has a flow passage causing the second control chamber to communicate with the second pilot chamber, and is driven by the actuator, and the control valve is configured such that the first control chamber and the second control chamber are able to communicate with each other via a gap between the second member and the first member.

3. The damping force adjusting mechanism according to claim 1,
   wherein the control valve includes a first member that is disposed on a first control chamber side and has a flow passage causing the first control chamber to communicate with the first pilot chamber; a second member that is disposed on a second control chamber side so as to abut against the first member, has a flow passage causing the second control chamber to communicate with the second pilot chamber, and is driven by the actuator; and a holding member that is housed inside the control chamber, slidably houses the second member, and is formed integrally with the first member, and the control valve is configured such that the first control chamber and the second control chamber are able to communicate with each other via a gap between the holding member and the housing, or a gap between the second member and the first member.

4. The damping force adjusting mechanism according to claim 2, further comprising:
a return spring that is interposed between the first member and the second member, and urges the first member and the second member in a direction in which the gap therebetween widens.

5. The damping force adjusting mechanism according to claim 3, further comprising:
a control spring that is interposed between the holding member and the housing, and urges the holding member and the housing in a direction in which the gap therebetween closes.

6. The damping force adjusting mechanism according to claim 4,
wherein the actuator includes a linear solenoid that is mounted on the housing and a plunger that drives the second member in accordance with excitation of the linear solenoid, and is configured such that a flow passage area of the flow passage in the second member is reduced during non-excitation of the linear solenoid compared to that during the excitation thereof.

7. The damping force adjusting mechanism according to claim 1,
wherein the case is configured of a cylindrical body that houses the operating fluid and the housing is configured of a piston that slidably moves inside the cylindrical body and separates the inside of the cylindrical body into an upper chamber that is the first fluid chamber and a lower chamber that is the second fluid chamber, the sealing member being mounted on the piston, and the damping force adjusting mechanism is configured so as to control the operating fluid flowing inside the cylindrical body via the piston and to adjust the damping force.

8. A damping force adjusting mechanism comprising:
a case that houses an operating fluid;
a sealing member that separates an inside of the case into a first fluid chamber and a second fluid chamber;
a housing that holds the sealing member and houses the sealing member in the case;
a damping valve that is housed inside the housing and performs control of opening and closing between the first fluid chamber and the second fluid chamber;
a first pilot chamber and a second pilot chamber which are separately formed inside the housing with the damping valve therebetween;
a first communication passage that causes the first fluid chamber to communicate with the first pilot chamber;
a second communication passage that causes the second fluid chamber to communicate with the second pilot chamber;
a first fixed orifice that is interposed in the first communication passage;
a second fixed orifice that is interposed in the second communication passage;
a control chamber that is formed inside the housing and communicates with the first pilot chamber and the second pilot chamber;

a control valve that is housed inside the control chamber, separates the control chamber into a first control chamber communicating with the first pilot chamber and a second control chamber communicating with the second pilot chamber, and selects a flow of the fluid from the first control chamber to the second control chamber or a flow of the fluid in a reverse direction with respect to the flow of the fluid in accordance with magnitudes of fluid pressures inside the first control chamber and the second control chamber; and
an actuator that controls electrical driving of the control valve and controls the fluid pressure inside the first pilot chamber or the second pilot chamber,
wherein the control valve includes a first member that is provided in the housing, is disposed on a first control chamber side, and has a flow passage causing the first control chamber to communicate with the first pilot chamber; a second member that is disposed on a second control chamber side so as to abut against the first member, has a flow passage causing the second control chamber to communicate with the second pilot chamber, and is driven by the actuator; and a return spring that is interposed between the first member and the second member, and urges the first member and the second member in a direction in which a gap therebetween widens, and the control valve is configured such that the first control chamber and the second control chamber are able to communicate with each other via the gap between the second member and the first member.

9. The damping force adjusting mechanism according to claim 8,
wherein the case is configured of a cylindrical body that houses the operating fluid and the housing is configured of a piston that slidably moves inside the cylindrical body and separates the inside of the cylindrical body into an upper chamber that is the first fluid chamber and a lower chamber that is the second fluid chamber, the sealing member being mounted on the piston, and the damping force adjusting mechanism is configured so as to control the operating fluid flowing inside the cylindrical body via the piston and to adjust the damping force.

10. A damping force adjusting mechanism comprising:
a case that houses an operating fluid;
a sealing member that separates an inside of the case into a first fluid chamber and a second fluid chamber;
a housing that holds the sealing member and houses the sealing member in the case;
a damping valve that is housed inside the housing and performs control of opening and closing between the first fluid chamber and the second fluid chamber;
a first pilot chamber and a second pilot chamber which are separately formed inside the housing with the damping valve therebetween;
a first communication passage that causes the first fluid chamber to communicate with the first pilot chamber;
a second communication passage that causes the second fluid chamber to communicate with the second pilot chamber;
a first fixed orifice that is interposed in the first communication passage;
a second fixed orifice that is interposed in the second communication passage;
a control chamber that is formed inside the housing and communicates with the first pilot chamber and the second pilot chamber;

a control valve that is housed inside the control chamber, separates the control chamber into a first control chamber communicating with the first pilot chamber and a second control chamber communicating with the second pilot chamber, and selects a flow of the fluid from the first control chamber to the second control chamber or a flow of the fluid in a reverse direction with respect to the flow of the fluid in accordance with magnitudes of fluid pressures inside the first control chamber and the second control chamber; and an actuator that controls electrical driving of the control valve and controls the fluid pressure inside the first pilot chamber or the second pilot chamber, wherein the control valve includes a first member that is provided in the housing, is disposed on a first control chamber side, and has a flow passage causing the first control chamber to communicate with the first pilot chamber; a second member that is disposed on a second control chamber side so as to abut against the first member, has a flow passage causing the second control chamber to communicate with the second pilot chamber, and is driven by the actuator; and a return spring that is interposed between the first member and the second member, and urges the first member and the second member in a direction in which a gap therebetween widens, and the control valve is configured such that the first control chamber and the second control chamber are able to communicate with each other via the gap between the second member and the first member, and wherein the actuator includes a linear solenoid that is mounted on the housing and a plunger that drives the second member in accordance with excitation of the linear solenoid, and is configured such that a flow passage area of the flow passage in the second member is reduced during non-excitation of the linear solenoid compared to that during the excitation thereof.

11. The damping force adjusting mechanism according to claim 10, wherein the case is configured of a cylindrical body that houses the operating fluid and the housing is configured of a piston that slidably moves inside the cylindrical body and separates the inside of the cylindrical body into an upper chamber that is the first fluid chamber and a lower chamber that is the second fluid chamber, the sealing member being mounted on the piston, and the damping force adjusting mechanism is configured so as to control the operating fluid flowing inside the cylindrical body via the piston and to adjust the damping force.

* * * * *